(12) United States Patent
Yang et al.

(10) Patent No.: US 11,820,296 B2
(45) Date of Patent: Nov. 21, 2023

(54) PUSH-BUTTON ACTUATED REAR LATCH HOOK MECHANISM

(71) Applicant: Havis, Inc., Warminster, PA (US)

(72) Inventors: Kou Yang, Farmington Hills, MI (US); Stephen Telesco, Dexter, MI (US); Keith Halonen, Howell, MI (US); Bruce Jonik, Canton, MI (US); David Skiver, Livonia, MI (US)

(73) Assignee: Havis, Inc., Warminster, PA (US)

( * ) Notice: Subject to any disclaimer, the term of this patent is extended or adjusted under 35 U.S.C. 154(b) by 145 days.

(21) Appl. No.: 17/377,671

(22) Filed: Jul. 16, 2021

(65) Prior Publication Data

US 2023/0020987 A1    Jan. 19, 2023

(51) Int. Cl.
*B60R 11/02* (2006.01)
*B60R 11/00* (2006.01)

(52) U.S. Cl.
CPC ...... *B60R 11/0252* (2013.01); *B60R 11/0205* (2013.01); *B60R 11/0229* (2013.01); *B60R 2011/0003* (2013.01); *B60R 2011/0071* (2013.01)

(58) Field of Classification Search
CPC ...................... B60R 2011/007; B60R 11/0252
See application file for complete search history.

(56) References Cited

U.S. PATENT DOCUMENTS

| | | |
|---|---|---|
| 5,555,491 A | 9/1996 | Tao |
| 5,859,762 A | 1/1999 | Clark et al. |
| 5,964,601 A * | 10/1999 | Tsurumaru ............. B60R 11/02 439/341 |
| 6,280,212 B1 | 8/2001 | Nguyen et al. |
| 7,097,082 B2 | 8/2006 | Wallaker |
| 7,506,843 B2 | 3/2009 | McKelvey |
| 7,978,466 B2 * | 7/2011 | Lewandowski ....... G06F 1/1632 361/679.41 |

(Continued)

FOREIGN PATENT DOCUMENTS

| | | |
|---|---|---|
| JP | H05153524 A | 6/1993 |
| JP | 2005041441 A | 2/2005 |
| WO | 0115940 A1 | 3/2001 |

OTHER PUBLICATIONS

Great Britain Search Report for GB Application No. GB1614031.1, dated Jan. 26, 2017, 1 page.

*Primary Examiner* — Kyle A Cook
(74) *Attorney, Agent, or Firm* — RatnerPrestia

(57) ABSTRACT

An apparatus for mounting within a vehicle, an object having at least one receptacle in a first main surface. The apparatus comprises a base having a mounting surface. A latch and a frame are movable between latched and unlatched positions and are biased toward the latched position by a first biasing element. One or more push buttons are movable between extended and depressed positions and are biased toward the extended position by a second biasing element. A lower portion of the push button blocks and allows movement of the frame toward the latched position when the push button is in the extended and depressed position, respectively. The first main surface pushes the push button to the depressed position, thereby enabling the first biasing element to move the latch and the frame to the latched position, in which the latch engages with the at least one receptacle.

19 Claims, 8 Drawing Sheets

(56) References Cited

U.S. PATENT DOCUMENTS

| | | |
|---|---|---|
| 8,074,951 B2 | 12/2011 | Carnevali |
| 8,821,173 B2 | 9/2014 | Carnevali |
| 2002/0064030 A1 | 5/2002 | Shimizu |
| 2002/0131234 A1 | 9/2002 | Sterner et al. |
| 2008/0002354 A1 | 1/2008 | Carnevali |
| 2009/0014487 A1 | 1/2009 | Fan |
| 2009/0179435 A1* | 7/2009 | Lev ................. E05B 65/006 |
| | | 292/164 |
| 2009/0212189 A1 | 8/2009 | Carnevali |
| 2010/0007805 A1* | 1/2010 | Vitito ................ B60N 2/879 |
| | | 348/837 |
| 2012/0045932 A1 | 2/2012 | Carnevali |
| 2017/0136960 A1* | 5/2017 | Kim ................. F16M 11/041 |
| 2021/0048848 A1* | 2/2021 | Pischel ............... G06F 1/1656 |

* cited by examiner

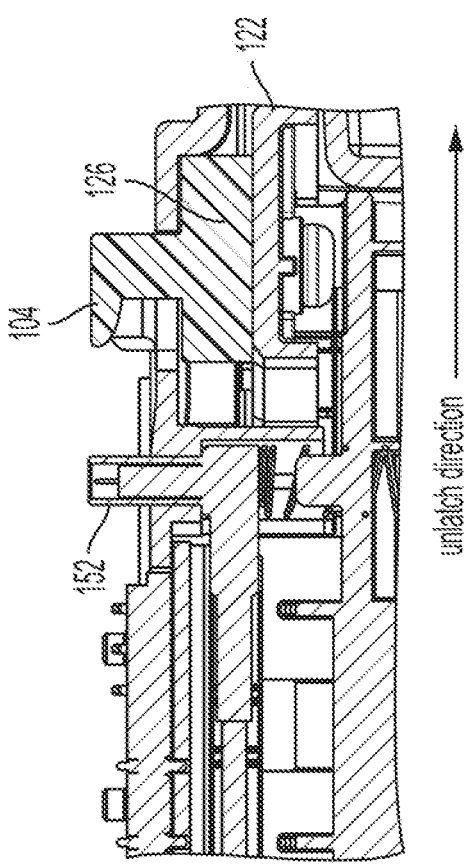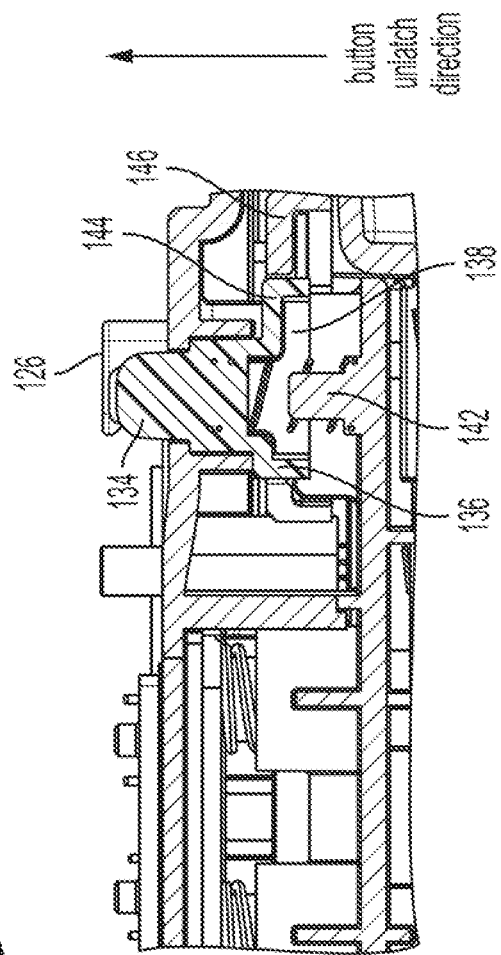

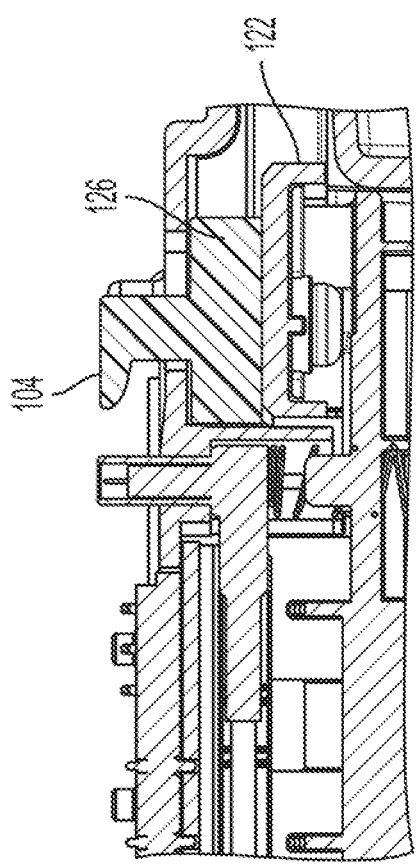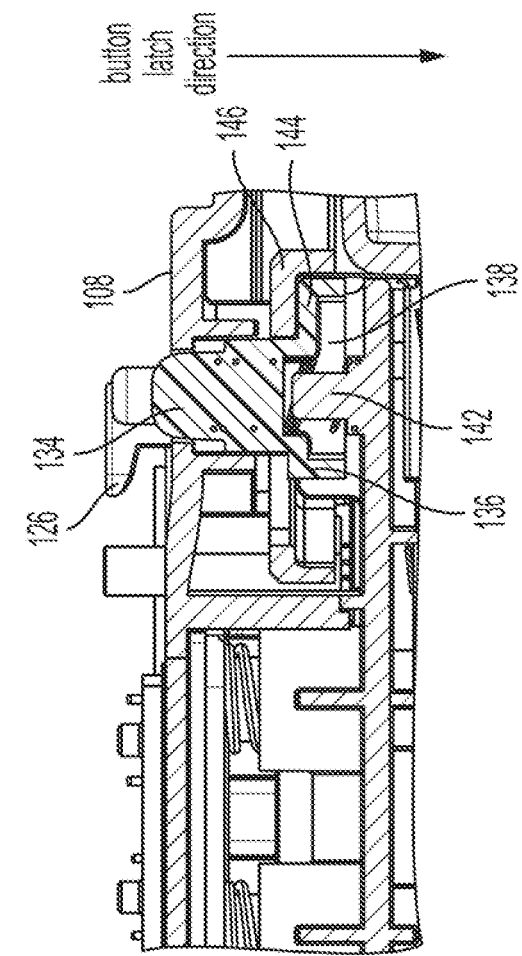

PUSH-BUTTON ACTUATED REAR LATCH HOOK MECHANISM

TECHNICAL FIELD

The present invention relates generally to mounting apparatuses, and more particularly, to apparatuses for securely mounting objects within a moving vehicle.

BACKGROUND

Specialized vehicles are an essential tool in many different professions. For example, professions such as law enforcement commonly utilize a number of specialized electronic apparatuses (e.g., computers, radio systems, sirens) that are not found in conventional automobiles. Other professions and enterprises also commonly have a need to use vehicles with similar specialized equipment. For example, customized electronics apparatuses are frequently installed in vehicles such as forklifts, waste collection trucks, utility trucks, construction equipment and agricultural equipment. While vehicles may be specially manufactured that include these apparatuses, these apparatuses may also be added to conventional automobiles or other vehicles through after-market installations. This is particularly true in the context of law enforcement vehicles, because these vehicles are usually based on conventional road vehicles, and each vehicle can require unique customizations depending upon the particular requirements of the jurisdiction or purpose.

While vehicles are commonly fitted with custom electronics and other equipment, it can be problematic to install such devices in a simple and effective manner. For example, conventional vehicle interior cabins may lack equipment that provides suitable mechanical and/or electrical interfaces for specialized electronic apparatuses. This leads to irregular and relatively inefficient mounting of such devices, as well as inability to maintain specialized electronic apparatuses or equipment in safe and reliable functioning condition.

There remains a need to provide alternative docking stations configured to mount specialized electronic apparatuses or equipment in vehicles, and particularly for retrofitting existing vehicles to include specialized electronic apparatuses or equipment.

SUMMARY

Aspects of the present invention are directed to apparatuses for mounting objects within a vehicle.

In one exemplary aspect, there is provided apparatus for mounting an object within a vehicle. The object has a first main surface and at least one receptacle in the first main surface. The apparatus comprises a base configured to receive the object and the base comprises a mounting surface facing the first main surface of the object when the object is mounted to the base. The apparatus includes a latch extending from the mounting surface of the base and being movable between a latched position and an unlatched position. The apparatus includes a frame positioned within the base and fixedly coupled to the latch such that the frame is movable between the latched position and the unlatched position. The apparatus has a first biasing element configured to bias the latch and the frame toward the latched position. The apparatus includes one or more push buttons extending from the mounting surface of the base, the one or more push buttons being movable between an extended position and a depressed position. At least one of the one or more push buttons has a lower portion within the base and the lower portion is positioned to block movement of the frame from the unlatched position toward the latched position when the push button is in the extended position. The lower portion is positioned to allow movement of the frame from the unlatched position toward the latched position when the at least one of the one or more push buttons is in the depressed position. The apparatus comprises one or more second biasing elements associated with respective ones of the one or more push buttons. The one or more second biasing elements are configured to bias the one or more push buttons toward the extended position. When the object is positioned against the mounting surface, the first main surface of the object pushes the one or more push buttons to the depressed position, thereby enabling the first biasing element to move the latch and the frame to the latched position, in which the latch engages with the at least one receptacle in the first main surface to secure the object to the base.

In some exemplary aspects, the one or more push buttons comprise a pair of push buttons, and the one or more second biasing elements comprise a pair of second biasing elements.

In some exemplary aspects, each of the pair of push buttons has the lower portion positioned to block movement of the frame from the unlatched position toward the latched position when the push button is in the extended position.

In some exemplary aspects, each of the pair of push buttons has an upper portion extending from the mounting surface of the base, the upper portion fixedly coupled to the respective lower portion of each of the pair of push buttons.

In some exemplary aspects, the latch is positioned between the pair of push buttons.

In some exemplary aspects, the latch and the frame are movable between the latched position and the unlatched position in a direction parallel to the mounting surface.

In some exemplary aspects, the one or more push buttons are movable between the extended position and the depressed position in a direction orthogonal to the mounting surface.

In some exemplary aspects, the lower portion of the at least one of the one or more push buttons comprises a first stop surface positioned to engage with a second stop surface of the frame to block the movement of the frame from the unlatched position toward the latched position when the push button is in the extended position, and wherein when the at least one of the one or more push buttons is in the depressed position and the frame is in the latched position, the second stop surface of the frame is positioned between the mounting surface of the base and the first stop surface of the at least one of the one or more push buttons.

In some exemplary aspects, the mounting surface comprises one or more posts configured to mate with corresponding recesses of the object to align the object with the base during mounting.

In some exemplary aspects, each of the one or more posts is positioned adjacent a respective one of the one or more push buttons.

In some exemplary aspects, the apparatus further comprises a lever positioned at a surface of the base, the lever movably coupled to the frame.

In some exemplary aspects, the lever is not fixedly coupled to the frame.

In some exemplary aspects, the lever is positioned on a peripheral side surface of the base adjacent the mounting surface.

In some exemplary aspects, the lever is configured to be pressed to move the frame and the latch from the latched position to the unlatched position.

In some exemplary aspects, when the lever is pressed, the latch and the frame are moved toward the unlatched position, thereby enabling the one or more second biasing elements to move the one or more push buttons to the extended position, in which the lower portion of the at least one of the one or more push buttons blocks the frame from returning to the latched position.

In some exemplary aspects, when the object is mounted to the mounting surface, the one or more second biasing elements generate sufficient biasing force elevate the object away from the mounting surface in moving the one or more push buttons to the extended position.

In some exemplary aspects, the apparatus further comprises one or more projections extending from the base and configured to engage with a peripheral side surface of the object, the engagement between the one or more projections and the peripheral side surface of the object enabling the object to be pivoted between a mounted and an unmounted position of the object relative to the mounting surface of the base.

In some exemplary aspects, the apparatus further comprises electrical contacts positioned in an opening within the mounting surface, the electrical contacts configured to mate with corresponding contacts on the first main surface of the object.

In some exemplary aspects, the frame defines a further opening surrounding the opening within the mounting surface in which the electrical contacts are positioned.

In another exemplary aspect, there is provided a method for mounting an object within a vehicle. The object has a first main surface, and at least one receptacle in the first main surface The method includes positioning the object with the first main surface facing a mounting surface of a base configured to receive the object, a latch and one or more push buttons extending from the mounting surface. The method further includes moving the object toward the mounting surface such that the first main surface pushes the one or more push buttons to a depressed position, the movement of the one or more push buttons to the depressed position enabling the latch to move to a latched position in which the latch engages with the at least one receptacle in the first main surface to secure the object to the base.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be omitted. In addition, according to common practice, the various features of the drawings are not drawn to scale unless otherwise indicated, and the dimensions of the various features may be expanded or reduced for clarity. Included in the drawings are the following figures:

FIG. 4A shows a cross-section view of a portion of the base of FIG. 2, showing an unlatched position of the latch.

FIG. 4B shows a cross-section view of a portion of the base of FIG. 2, showing an extended position of the push button when the latch is in the unlatched position.

FIG. 5A shows a cross-section view of a portion of the base of FIG. 2, showing a latched position of the latch.

FIG. 5B shows a cross-section view of a portion of the base of FIG. 2, showing a depressed position of the push button when the latch is in the latched position.

DETAILED DESCRIPTION

The apparatuses disclosed herein are usable to provide mounting for objects within conventional vehicles (such as automobiles). While the disclosed apparatuses are described herein with respect to mounting within the cabin of a vehicle, it will be understood that the invention is not so limited. To the contrary, aspects of the present invention are usable in any application in which a mount is desired.

While any objects may be mounted to the disclosed exemplary embodiments, the disclosed mounting apparatuses are particularly suitable for mounting electronic devices, such as computers, laptops, tablets, radios, or the like. Other electronic devices or objects mountable with the disclosed apparatuses will be known to those of ordinary skill in the art from the description herein. The mounting apparatuses may be configured to hold the device in a fixed position, or to allow the device to move (e.g., rotate, pivot, etc.) between various positions (e.g., use and stowed positions, driver-side and passenger-side use positions, movement to accommodate user preferences, etc.). In addition, mounting apparatuses may be configured to mount multiple objects or devices simultaneously.

Figure 1A:
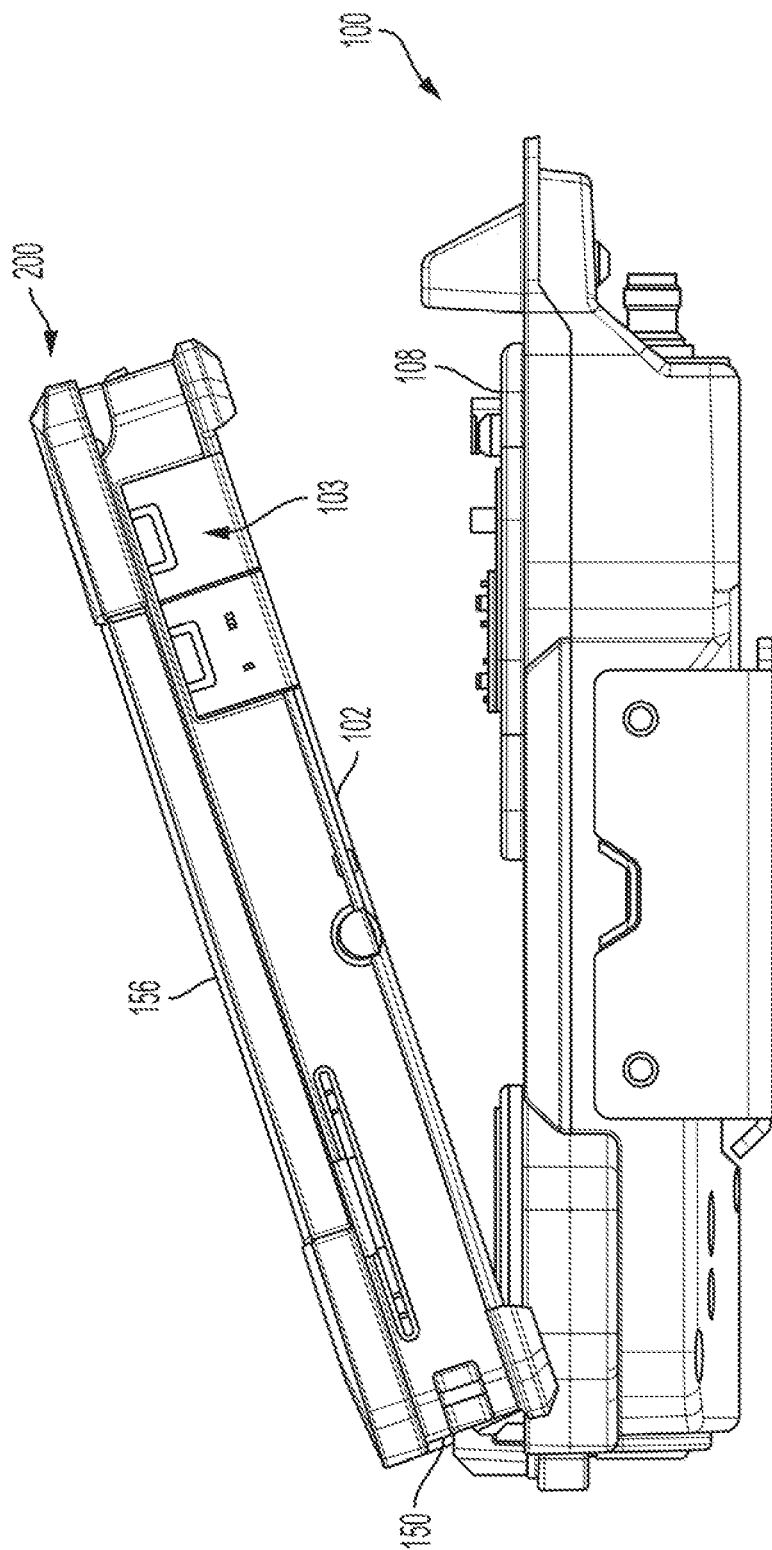
FIGS. 1A-1B show side views of an exemplary apparatus for mounting an object within a vehicle.
Figure 1B:
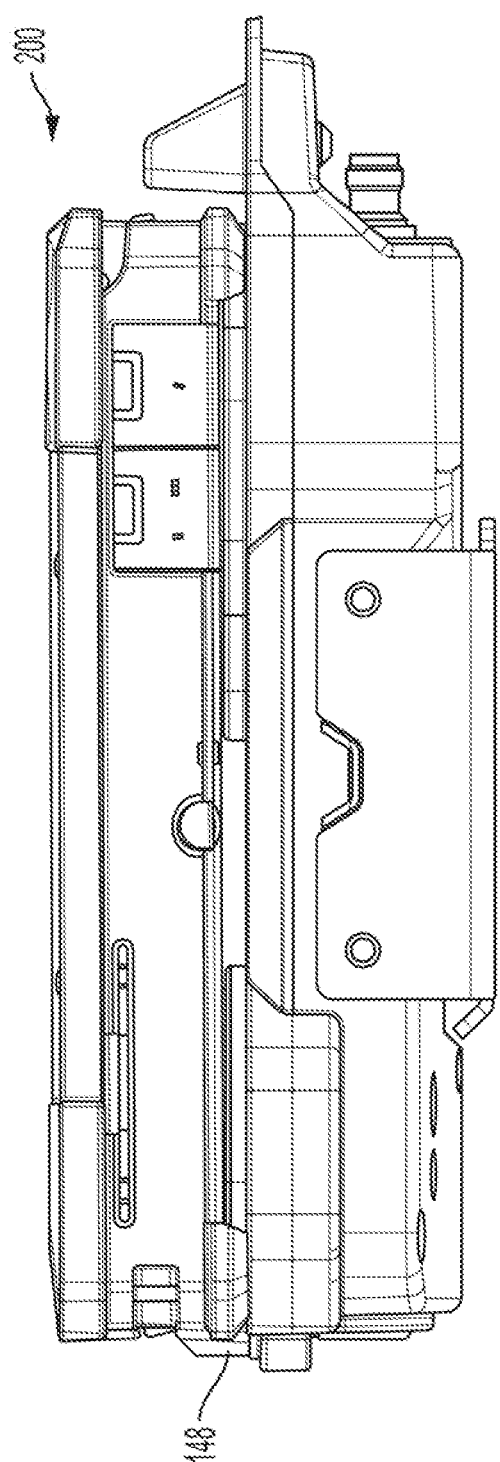

With reference to the drawings, FIGS. 1A-1B illustrates an exemplary apparatus 100 for mounting one or more objects 200 within a vehicle cabin. For one example, an object 200 may have a first main surface 102 (e.g., a bottom or back surface of the computer or laptop), a second main surface 156 opposite the first main surface 102 (e.g., a computer or laptop surface including a keyboard, touchscreen, and/or display), one or more peripheral side surfaces 150 at least partially surrounding the first and/or second main surfaces, and at least one receptacle 103 in the first main surface 102.

An exemplary base 106 of the apparatus 100 is configured to receive the one or more objects 200. In some examples, the base 106 may be positioned along the fore-aft centerline of a vehicle between the front seating positions, and generally within arm's reach of the driver. The base 106 generally includes a mounting surface 108 configured to face the first main surface 102 of the object 200. As seen in FIGS. 1A-1B, the mounting surface 108 is positioned to face the first main surface 102 of the object 200 when the object 200 is received by the base 106. The base 106 may further comprise one or more peripheral side surfaces 110, as shown in FIG. 7A.

Figure 2:
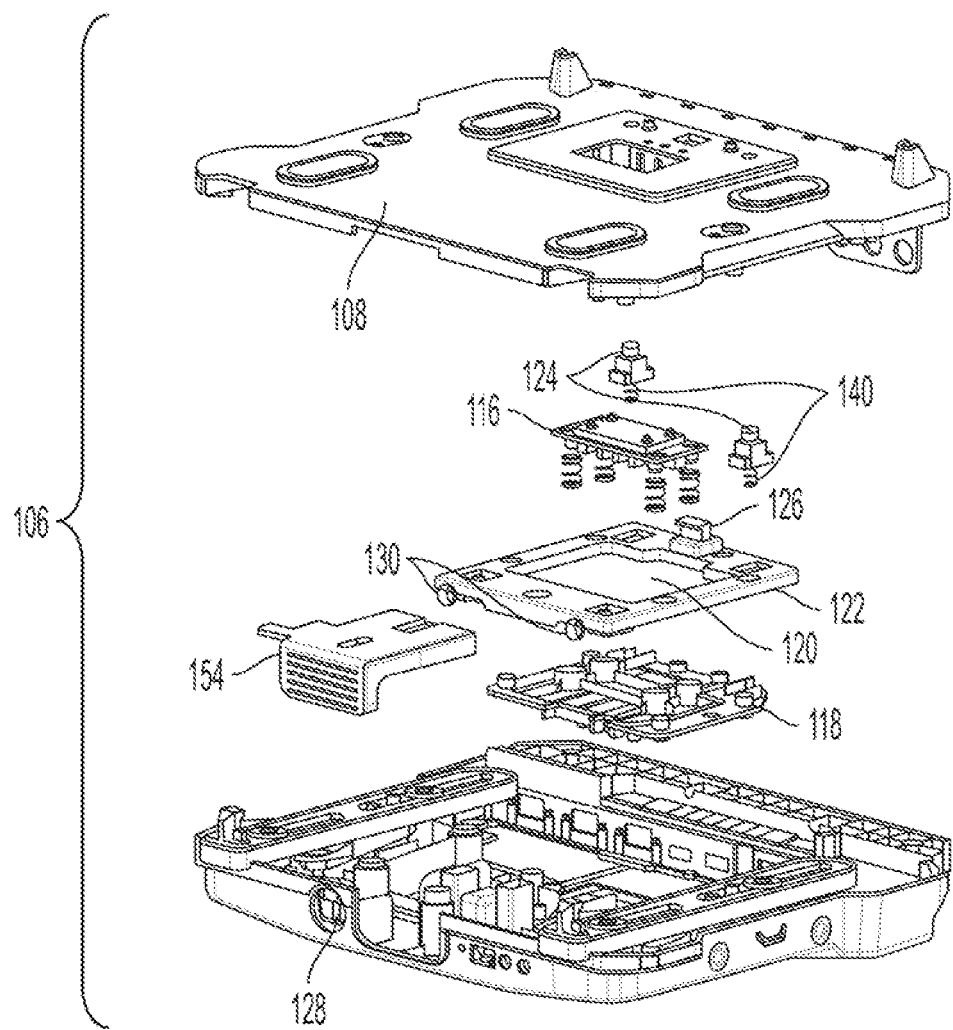
FIG. 2 is an exploded view of an exemplary base of the apparatus of FIG. 1.
Figure 7B:
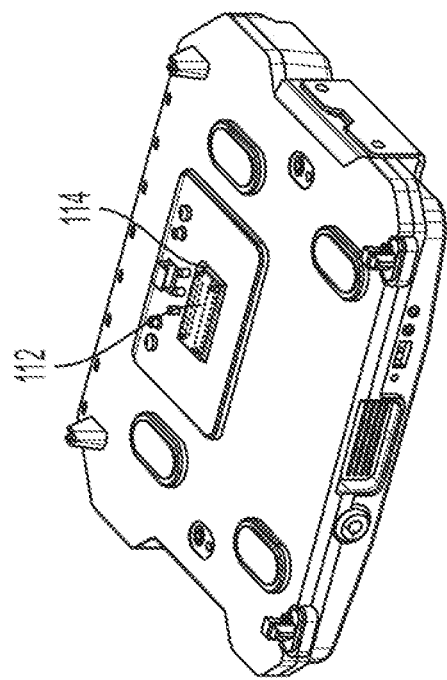
FIG. 7A-7B show perspective views of the base of FIG. 2, showing an exemplary lever.
Figure 7A:
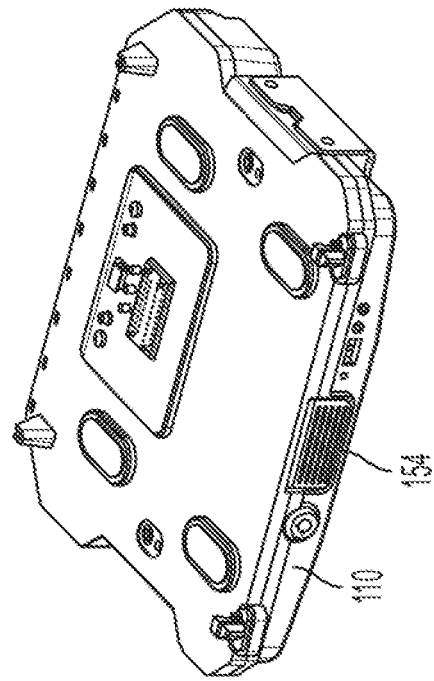

Additionally or optionally, the first main surface 102 of the object 200 is positioned, such that one or more electrical contacts in the first main surface 102 of the object 200 interface with one or more electrical contacts 112 positioned in an opening 114 within the mounting surface 108, as shown in FIGS. 7A-7B. The one or more electrical contacts 112 of the base 106 are configured to mate with corresponding electrical contacts on the first main surface 102 of the object 200. As seen in FIG. 2, the electrical contacts 112 may be disposed on a spring-loaded docking connector 116, which is secured within the base 106 by a docking connector enclosure 118. The one or more electrical contacts 112 of the base 106 are further positioned within a further opening 120 defined by a frame 122, the further opening 120 surrounding the opening 114 within the mounting surface 108.

The base 106 has sufficient rigidity and strength to securely fix one or more different types of objects or accessories, such as a laptop or tablet computer, computer display screen, radio communication device, and so on. For example, the base 106 may comprise a metal part made of, for example, folded 20 gauge steel, cast aluminum, or the like. The load-bearing capacity of the base 106 preferably is selected to hold the largest compatible object without substantial movement during normal operation of the object and movement of the vehicle. Persons or ordinary skill in the art will understand how to design the base 106 to obtain the desired rigidity and strength based on known engineering principles, which need not be explained in detail herein.

The base 106 may comprise a single unitary part, or it may be an assembly of structural elements comprising multiple individual unitary parts. For example, as shown in FIG. 2, the base 106 may be an assembly of parts including the mounting surface 108, the frame 122, one or more push buttons 124, a latch 126, and a rear cover 128. Certain components of base 106 may be housed within or between mounting surface 108 and rear cover 128. The mounting surface 108, the frame 122, the one or more push buttons 124, and the latch 126 may be connected to each other using any suitable fasteners or combinations of fastening means, such as screws, nuts and bolts, rivets, welding, adhesives, and so on. The various parts of the base 106 may be formed using any suitable materials. For example, one or more of the parts may comprise sheet metal, cast metal, or machined metals parts. Steel and aluminum are considered to be suitable materials, but other materials, such as carbon fiber reinforce plastics or other composite materials may be used. Unreinforced structural plastics also may be used. Folded sheet metal is preferred for its low cost and high strength, but injection molded plastics, or cast or machined metal parts may be desirable to accommodate particularly complex shape requirements or reduce weight or part count.

The mounting surface 108 may have any suitable size and shape. Preferably, as seen in FIGS. 1A-1B, the mounting surface 108 is configured to have a size and shape that generally corresponds to the size and shape of the one or more objects 200 to be received. Additionally or optionally, the mounting surface 108 comprises a generally planar surface and/or is configured to substantially contact or face the first main surface 102 of the object 200. Still further, as illustrated in FIG. 2, the base 106 may comprise the mounting surface 108 and the rear cover 128 coupled to the mounting surface 108, such that together the mounting surface 108 and the rear cover 128 together enclose one or more components therein, with mounting surface 108 forming an upper side thereof and rear cover 128 forming an underside thereof.

Figure 3B:
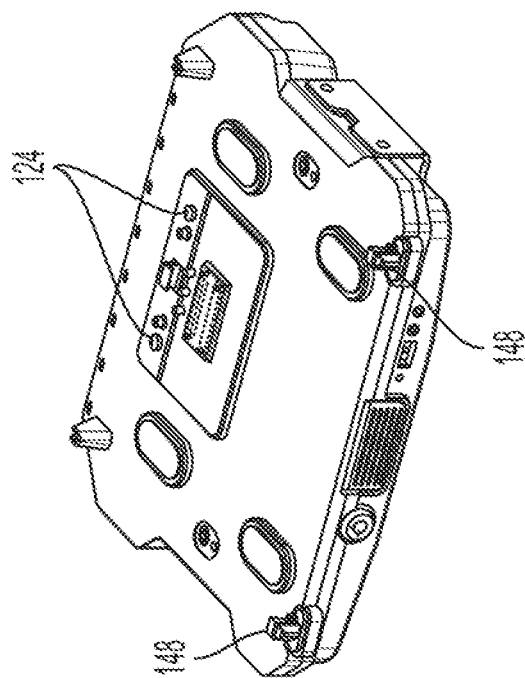
FIGS. 3A-3B show perspective views of the base of FIG. 2, showing an exemplary push button and an exemplary latch.
Figure 3A:
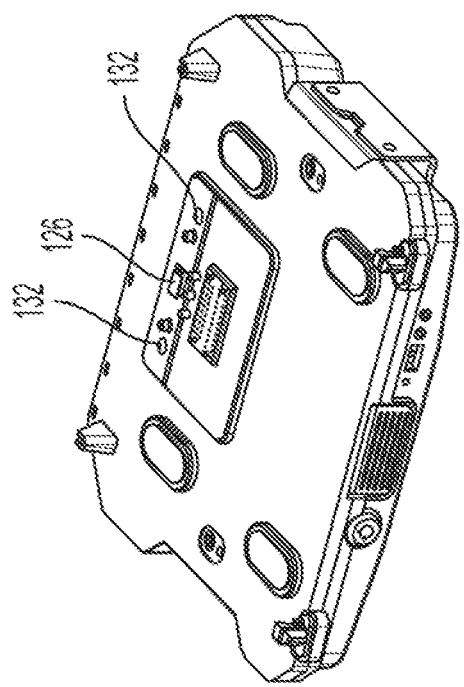

Referring now to FIGS. 2 and 3A, the apparatus 100 comprises the latch 126 configured to extend from the mounting surface 108 of the base 106. In a non-limiting example, as illustrated in FIG. 2, the frame 122 positioned within the base 106 is fixedly coupled to the latch 126, such that the frame 122 is movable with the latch 126 between latched and unlatched positions of the latch 126. The frame 122 and the latch 126 may be integrally formed as a single body of unitary construction, or may be separate and distinct components configured to be fixedly connected to each other using any suitable fasteners or combinations of fastening means, such as screws, nuts and bolts, rivets, welding, adhesives, and so on. Additionally or optionally, the latch 126 may be positioned between the one or more push buttons 124, such as a pair of push buttons 124 (further discussed below). The latch 126 may have a size and shape that corresponds to the at least one receptacle (not shown) defined in the first main surface 102 of the object 200. As depicted, for example, in FIGS. 3A, 4A, and 5A, the latch 126 comprises a hook portion 104 configured to engage with and secure the object 200 when the object 200 is mounted to the base 106. Specifically, the hook portion 104 is configured to engaged with the at least one receptacle 103 of the object 200 to prevent removal of object 200 from base 106. Other alternatives and variations of the latch 126 will be apparent to persons of ordinary skill in the art in view of the present disclosure. Latch 126 may further include a lock or other access control device to prevent release of a mounted object to unauthorized users. Suitable locks and/or access control devices for use in controlling the release of latch 126 will be understood to those of ordinary skill in the art.

The latch 126 is movable between the unlatched position (FIG. 4A) and the latched position (FIG. 5A). To facilitate the movement of the latch 126 between the unlatched and latched positions, the apparatus 100 includes at least one first biasing element 130, such as springs, configured to bias the latch 126 and frame 122 from the unlatched position toward the latched position. As seen in FIGS. 4A and 5A, the latch 126 is movable between the latched position and the unlatched position along or in a direction parallel to the mounting surface 108. In one example, latch 126 is movable between the latched position and the unlatched position along or in a latch direction (FIG. 5A) and an unlatch direction (FIG. 4A) opposite the latch direction.

In the latched position (FIG. 5A), the latch 126 engages with the at least one receptacle 103 in the first main surface 102 to secure the object 200 to the base 106. Specifically, the hook portion 104 of the latch 126 engages with the at least one receptacle 103 of the first main surface 102 of the object 200, such that the object 200 is held or secured when it is mounted to the base 106. Conversely, as seen in FIG. 4A, in the unlatched position, the hook portion 104 of the latch 126 is moved out of engagement with the at least one receptacle 103 of the first main surface 102 of the object 200, such that the object 200 is made removable from the base 106 or may be moved away from the mounting surface 108 of the base 106.

Referring now to FIGS. 2 and 3B, the apparatus 100 comprises one or more push buttons 124 extending from the mounting surface 108 of the base 106. For example, the one or more push buttons 124 may be configured to extend through openings 132 (FIG. 3A) defined by the mounting surface 108 of the base 106. The one or more push buttons 124 are depicted in FIG. 2 as distinct components separate from one or more components of the apparatus 100. However, one of ordinary skill in the art would understand from the description herein that the one or more push buttons 124 may be integrally formed together with any other of the one or more components of the apparatus 100, such as the mounting surface 108 or frame 122, as a single body of unitary construction. Other alternatives and variations of the push buttons 124 will be apparent to persons of ordinary skill in the art in view of the present disclosure.

At least one of the one or more push buttons 124 has an upper portion 134 extending from the mounting surface 108 of the base 106 and a lower portion 136 positioned within the base 106. As best seen in FIGS. 2, 4B, 5B, the upper portion 134 may be fixedly coupled to the respective lower portion 136 of each of the one or more push buttons 124. The upper portion 134 and the respective lower portion 136 are depicted as being integrally formed as a single body of unitary construction. However, one of ordinary skill in the art would understand from the description herein that the upper portion 134 and lower portion 136 may be distinct components separate from each other and/or separate from the other one or more components of the apparatus 100.

The lower portion 136 of the at least one of the one or more push buttons 124 may have any size or shape sufficient to be positioned within the base 106 or to move relative to the frame 122. In particular, the one or more push buttons 124 are configured to be movable between an extended position (FIG. 4B) and a depressed position (FIG. 5B). For example, the movement of the one or more buttons 124 between the extended and depressed positions is in a direction that is orthogonal to the mounting surface 108. For example, the one or more buttons 124 move between the extended and depressed positions in a button unlatch direction (FIG. 4B) and a button latch direction (FIG. 5B) that is opposite the unlatch direction. Still further, the one or more push buttons 124 are movable between the extended and the depressed positions relative to the frame 122.

Additionally or optionally, each of the one or more push buttons 124 may be configured to define a cavity 138 within which a second biasing element 140, such as a compression spring, is configured to be positioned, such that one or more second biasing elements 140 are associated with respective ones of the one or more push buttons 124. The one or more second biasing elements 140 are configured to bias the one or more push buttons 124 toward the extended position. Still further, as best seen in FIGS. 4B and 5B, the one or more second biasing elements 140 may be configured to wrap around a projection 142 defined by base 106 and the projection 142 may accommodate for the translational movement of the one or more push buttons 124 relative to the frame 122 between the extended and depressed positions.

As seen in FIG. 4B, when the at least one of the one or more push buttons 124 is in the extended position, the lower portion 136 of the one or more push buttons 124 is positioned to block movement of the frame 122 in the latch direction (i.e., from right to left) from the unlatched position toward the latched position. Specifically, the lower portion 136 of the at least one of the one or more push buttons 124 comprises a first stop surface 144 configured to engage with a second stop surface 146 of the frame 122. In operation, the first stop surface 144 of the lower portion 136 of the at least one of the one or more push buttons 124 is positioned to block movement of at least the second stop surface 146 of the frame 122 from the unlatched position toward the latched position. When the one or more push buttons 124 is in the extended position, the first stop surface 144 of the lower portion 136 is positioned to block movement of the frame 122 from the unlatched position toward the latched position.

Conversely, as depicted in FIG. 5B, when the at least one of the one or more push buttons 124 is in the depressed position, the lower portion 136 of the one or more push buttons 124 is positioned to allow movement of the frame 122 from the unlatched position toward the latched position. Particularly, movement of the one or more push buttons 124 toward the depressed position allows the second stop surface 146 of the frame 122 to move into a position between the mounting surface 108 of the base 106 and the first stop surface 144 of the at least one of the one or more push buttons 124. In operation, movement of the one or more push buttons 124 toward the depressed position and movement of the second stop surface 146 of the frame 122 to a position between the mounting surface 108 of the base 106 and the first stop surface 144 of the at least one of the one or more push buttons 124 corresponds to movement of the frame 122 and latch 126 to the latched position.

In a preferred embodiment, the one or more push buttons 124 includes a pair of push buttons and the one or more second biasing elements 140 comprise a pair of second biasing elements 140. Further, each of the pair of push buttons 124 has the lower portion 136 positioned to block movement of the frame 122 from the unlatched position toward the latched position when the push button 124 is in the extended position. Still further, each of the pair of push buttons 124 has the upper portion 134 extending from the mounting surface 108 of the base 106 and the upper portion 134 is fixedly coupled to the respective lower portion 136 of each of the pair of push buttons 124. Thus, in operation, when the object 200 is positioned against the mounting surface 108, the first main surface 108 of the object 200 pushes the pair of push buttons 124 toward the depressed position, thereby enabling the first biasing element 130 to move the frame 122 and the latch 126 to the latched position. This embodiment ensures that each of the pair of push buttons 124 must be pressed into the depressed position before the latch 126 and frame 122 can be released and a latching operation can occur. This requirement of depression of each push button 124 may desirably ensure proper alignment of the object 200 on the base 106.

As a starting point, prior to mounting the latch 126 is biased toward the latched position, as indicated by the latch direction in FIG. 5A, by one or more first biasing elements 130, such as compression springs. However, the latch 126 is held in the unlatched position by the one or more push buttons 124, each of which are biased toward the extended position, as indicated by the button unlatch direction in FIG. 4B, by one or more second biasing elements 140.

As illustrated in FIGS. 1A and 3B, base 106 may include one or more projections 148 extending from the base 106, e.g., at a generally orthogonal angle relative the mounting surface 108. The one or more projections 148 may be used to guide the object 200 as it is positioned against the mounting surface 108 and received by the base 106. A person of ordinary skill in the art would understand from the description herein that the one or more projections 148 may have any suitable size and shape, such that projections 148 contact at least one of the one or more peripheral side surfaces 150 of the object 200, or mate with corresponding recesses thereof, to firmly and reliably guide mating of the object 200 with the base 106. In this respect, the size of projections 148 may be precisely controlled with very limited manufacturing tolerances to promote such mating.

In a preferred example, the one or more projections 148 are configured for engaging with one of the one or more peripheral side surfaces 150 of the object 200. The engagement between the one or more projections 148 and the one of the one or more peripheral side surfaces 150 of the object 200 allows or enables the object 200 to be pivoted around projections 148 between an unmounted position (FIG. 1A) and a mounted position (FIG. 1B) of the object 200 relative to the mounting surface 108 of the base 106. For example, as seen in FIG. 1A, the object 200 is positioned obliquely relative to the mounting surface 108, and one of the one or more peripheral side surfaces 150 of the object 200 is engaged with the one or more projections 148 of the base 106.

The one or more projections 148 may be fixedly coupled to the mounting surface 108, as illustrated in FIGS. 3A-3B, but one of ordinary skill in the art would understand from the description herein that the one or more projections 148 may be a distinct component separate from the mounting surface 108. When the one or more projections 148 and the mounting surface 108 are not integrally formed, the one or more projections 148 may be connected to at least the mounting surface 108 via any suitable fasteners or combinations of fastening means, such as screws, nuts and bolts, rivets, welding, adhesives, and so on. Other alternatives and variations of the projections 148 will be apparent to persons of ordinary skill in the art in view of the present disclosure.

Additionally or optionally, alignment of the object 200 against the mounting surface 108 of the base 106 is guided by one or more posts 152. Specifically, the mounting surface 108 comprises one or more posts 152 that are configured to mate with corresponding recesses of the object 200 to align the object 200 with the base 106 during mounting. A person of ordinary skill in the art would understand from the description herein that the one or more posts 152 may have any suitable size and shape, such that posts 152 mate with corresponding openings of the first main surface 102 of object 200 to firmly and reliably guide mating of the object 200 with the base 106. In this respect, the size of posts 152 may be precisely controlled with very limited manufacturing tolerances to promote such mating. Other alternatives and variations of the posts 152 will be apparent to persons of ordinary skill in the art in view of the present disclosure.

Figure 6:
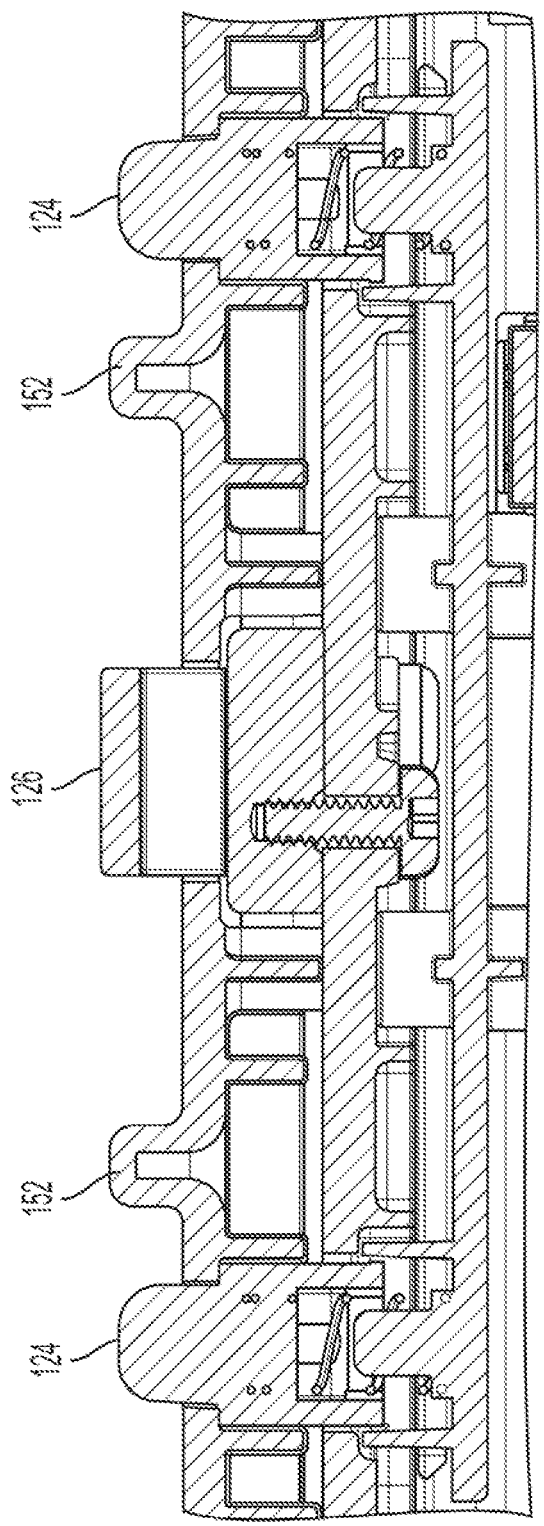
FIG. 6 shows a cross-section view of a portion of the base of FIG. 2, showing an exemplary post.

In a non-limiting example, as seen in FIG. 6, each of the one or more posts 152 may be positioned adjacent a respective one of the one or more push buttons 124. Advantageously, the one or more posts 152 further prevent accidental or premature latching of the object 200 to the base 106. This is achieved by elevating a height of the one or more posts 152 at an elevated distance relative to a height of the one or more push buttons 124, thereby preventing the one or more push buttons 124 from being accidentally pressed and actuated unless the object 200 is in proper alignment with posts 152. Stated differently, the height of the one or more posts 152 require that the object 200, such as computer or laptop, be properly aligned first prior to permitting the application of external force or pressure by object 200 on the one or more push buttons 124 to activate the latch 126, i.e. move the latch 126 to the latched position.

As the object 200 is pivoted between the unmounted and mounted positions and the object 200 is positioned against the mounting surface 108, an application of force or pressure on the one or more push buttons 124 causes the one or more push buttons 124 to move in a downward movement, e.g. along the button latch direction of FIG. 5B, toward the depressed position. In particular, when the at least one of the one or more push buttons 124 reaches the depressed position, the lower portion 136 of the one or more push buttons 124 disengages from frame 122, thereby allowing movement of the frame 122 from the unlatched position toward the latched position. When the frame 122 reaches the latched position, the second stop surface 146 of the frame 122 is positioned between the mounting surface 108 of the base 106 and the first stop surface 144 of the at least one of the one or more push buttons 124, blocking movement of the one or more push buttons toward the extended position. When the frame 122 is moved toward the latched position, the latch 126 moves toward the latched position, wherein the latch 126 engages with the at least one receptacle 103 in the first main surface 102 for securing the object 200 to the base 106. Specifically, the hook portion 104 of the latch 126 engages with the at least one receptacle 103 of the first main surface 102 of the object 200, such that the object 200 is held or secured when it is mounted to the base 106.

Referring now to FIGS. 2 and 7A-7B, to release the object 200 from the mounted position, the apparatus 100 comprises a releasable actuator, such as a lever 154, positioned at a surface, such as one of the one or more peripheral side surfaces 110, of the base 106. The lever 154 is configured to move the frame 122 and the latch 126 between the latched and unlatched positions and more specifically, from the latched to the unlatched position. In the non-limiting example illustrated by FIGS. 2 and 7A-7B, the lever 154 is positioned on one of the one or more peripheral side surfaces 110 of the base 106 adjacent the mounting surface 108. Further, the lever 154 may be movably coupled to the frame 122 and/or may not be fixedly coupled to the frame 122, such that lever 154 can return to an un-pressed position when latch 126 and frame 122 are in the unlatched position.

The lever 154 is configured to be actuated or pressed to move the frame 122 and the latch 126 from the latched position to the unlatched position. In operation, when the object 200 is mounted and the lever 154 is pressed, the latch 126 and the frame 122 are moved toward the unlatched position, thereby unblocking push bottoms 124 and enabling the one or more second biasing elements 140 to move the one or more push buttons 124 back to the extended position. In a preferred example, the one or more second biasing elements 140 are configured to generate sufficient biasing force to elevate the object 200 away from the mounting surface 108 in moving the one or more push buttons 124 to the extended position. When the one or more push buttons 124 reach the extended position, the lower portion 136 of the at least one of the one or more push buttons 124 once again blocks movement of the frame 122 toward the latched position, such that the frame 122 and the latch 126 are held in the unlatched position. When the frame 122 and the latch 126 are in the unlatched position, the hook portion 104 of the latch 126 is blocked from engaging with the one or more receptacles 103 of the first main surface 102 of the object 200. The object 200 may then be removed from the apparatus 100, or moved away from the mounting surface 108 of the base 106. Lever 154 may remain in a pressed position (e.g., if fixedly coupled to frame 122), or may returned to an un-pressed position under a biasing force (e.g., if not fixed to frame 122).

FIGS. 2 and 7A-7B depict the lever 154 as an individual part that is separate from the frame 122, but a person of ordinary skill in the art would understand that the lever 154 and one or more components of the apparatus 100, such as the frame 122, may be integrally formed together as a single unitary part. Other alternatives and variations of the lever 154 will be apparent to persons of ordinary skill in the art in view of the present disclosure.

The embodiments described herein may provide advantages over various prior art docking stations that involve multiple steps to securely mount and latch an object, such as computer or laptop. In particular, the disclosed embodiments may enable a single-step operation for mounting the object 200 to apparatus 100. For example, the multiple steps of prior art docking stations may comprise an alignment step of the object in the correct orientation relative to the apparatus and separately, a latching step involving a secondary actuator or handle that would activate the latch mechanism for securing the object. However, the present invention provides an improvement by requiring only the simple, single-step mounting process laid out above, i.e. the latch 126 is simultaneously actuated as the object is guided in the correct mounted orientation. Advantageously, this single-step design allows the computer or laptop to be mounted and unmounted single-handedly and with minimal effort.

Although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. An apparatus for mounting an object within a vehicle, the object having a first main surface, and at least one receptacle in the first main surface, the apparatus comprising:
    a base configured to receive the object, the base comprising a mounting surface facing the first main surface of the object when the object is mounted to the base,
    a latch extending from the mounting surface of the base, the latch movable between a latched position and an unlatched position;
    a frame positioned within the base and fixedly coupled to the latch such that the frame is movable between the latched position and the unlatched position;
    a first biasing element configured to bias the latch and the frame toward the latched position;
    one or more push buttons extending from the mounting surface of the base, the one or more push buttons movable between an extended position and a depressed position, at least one of the one or more push buttons having a lower portion within the base, the lower portion positioned to block movement of the frame from the unlatched position toward the latched position when the one or more push buttons is in the extended position, and positioned to allow movement of the frame from the unlatched position toward the latched position when the at least one of the one or more push buttons is in the depressed position; and
    one or more second biasing elements associated with respective ones of the one or more push buttons, the one or more second biasing elements configured to bias the one or more push buttons toward the extended position;
    wherein when the object is positioned against the mounting surface, the first main surface of the object pushes the one or more push buttons to the depressed position, thereby enabling the first biasing element to move the latch and the frame to the latched position, in which the latch engages with the at least one receptacle in the first main surface to secure the object to the base.

2. The apparatus of claim 1, wherein the lower portion of the at least one of the one or more push buttons comprises a first stop surface positioned to engage with a second stop surface of the frame to block the movement of the frame from the unlatched position toward the latched position when the push button is in the extended position, and wherein when the at least one of the one or more push buttons is in the depressed position and the frame is in the latched position, the second stop surface of the frame is positioned between the mounting surface of the base and the first stop surface of the at least one of the one or more push buttons.

3. The apparatus of claim 1, further comprising one or more projections extending from the base and configured to engage with a peripheral side surface of the object, the engagement between the one or more projections and the peripheral side surface of the object enabling the object to be pivoted between a mounted and an unmounted position of the object relative to the mounting surface of the base.

4. The apparatus of claim 1, wherein the latch and the frame are movable between the latched position and the unlatched position in a direction parallel to the mounting surface.

5. The apparatus of claim 4, wherein the one or more push buttons are movable between the extended position and the depressed position in a direction orthogonal to the mounting surface.

6. The apparatus of claim 1, wherein the mounting surface comprises one or more posts configured to mate with corresponding recesses of the object to align the object with the base during mounting.

7. The apparatus of claim 6, wherein each of the one or more posts is positioned adjacent a respective one of the one or more push buttons.

8. The apparatus of claim 1, further comprising electrical contacts positioned in an opening within the mounting surface, the electrical contacts configured to mate with corresponding contacts on the first main surface of the object.

9. The apparatus of claim 8, wherein the frame defines a further opening surrounding the opening within the mounting surface in which the electrical contacts are positioned.

10. The apparatus of claim 1, wherein the one or more push buttons comprise a pair of push buttons, and the one or more second biasing elements comprise a pair of second biasing elements.

11. The apparatus of claim 10, wherein the latch is positioned between the pair of push buttons.

12. The apparatus of claim 10, wherein each of the pair of push buttons has the lower portion positioned to block movement of the frame from the unlatched position toward the latched position when the push button is in the extended position.

13. The apparatus of claim 12, wherein each of the pair of push buttons has an upper portion extending from the mounting surface of the base, the upper portion fixedly coupled to the respective lower portion of each of the pair of push buttons.

14. The apparatus of claim 1, further comprising a lever positioned at a surface of the base, the lever movably coupled to the frame.

15. The apparatus of claim 14, wherein the lever is not fixedly coupled to the frame.

16. The apparatus of claim 14, wherein the lever is positioned on a peripheral side surface of the base adjacent the mounting surface.

17. The apparatus of claim 16, wherein the lever is configured to be pressed to move the frame and the latch from the latched position to the unlatched position.

18. The apparatus of claim 17, wherein when the lever is pressed, the latch and the frame are moved toward the unlatched position, thereby enabling the one or more second biasing elements to move the one or more push buttons to the extended position, in which the lower portion of the at least one of the one or more push buttons blocks the frame from returning to the latched position.

19. The apparatus of claim 18, wherein when the object is mounted to the mounting surface, the one or more second biasing elements generate sufficient biasing force to elevate the object away from the mounting surface in moving the one or more push buttons to the extended position.

\* \* \* \* \*